US009663020B2

(12) United States Patent
Ehl et al.

(10) Patent No.: US 9,663,020 B2
(45) Date of Patent: May 30, 2017

(54) LIGHTWEIGHT CHASSIS

(71) Applicant: HYMER GmbH & Co. KG, Bad Waldsee (DE)

(72) Inventors: Stefan Ehl, Ravensburg (DE); Thomas Buschle, Bad Wurzach (DE)

(73) Assignee: Hymer GmbH & Co. KG, Bad Waldsee (DE)

( * ) Notice: Subject to any disclaimer, the term of this patent is extended or adjusted under 35 U.S.C. 154(b) by 14 days.

(21) Appl. No.: 14/736,557

(22) Filed: Jun. 11, 2015

(65) Prior Publication Data
US 2016/0001692 A1    Jan. 7, 2016

Related U.S. Application Data

(63) Continuation of application No. PCT/EP2013/077900, filed on Dec. 23, 2013.

(30) Foreign Application Priority Data

Dec. 21, 2012  (DE) .......................... 10 2012 025 130

(51) Int. Cl.
*B60P 3/36*    (2006.01)
*B62D 21/15*   (2006.01)

(52) U.S. Cl.
CPC .............. *B60P 3/36* (2013.01); *B62D 21/152* (2013.01); *B62D 21/157* (2013.01)

(58) Field of Classification Search
CPC .... B62D 21/12; B62D 21/157; B62D 21/152; B60P 3/32; B60P 3/36
USPC .................................................. 296/154, 164
See application file for complete search history.

(56) References Cited

U.S. PATENT DOCUMENTS

| 3,731,970 A | | 5/1973 | Frank et al. | |
|---|---|---|---|---|
| 4,016,641 A | | 4/1977 | Abbott | |
| 4,746,164 A | * | 5/1988 | Crean | B60P 3/36 296/156 |
| 4,881,756 A | * | 11/1989 | Kumasaka | B62D 65/04 280/785 |
| 5,310,303 A | * | 5/1994 | Betts | B62D 27/06 224/538 |
| 5,342,106 A | * | 8/1994 | Fischer | B62D 33/0604 296/164 |

(Continued)

FOREIGN PATENT DOCUMENTS

| DE | 100 44 576 A1 | 3/2002 |
|---|---|---|
| DE | 10 2004 034 033 A1 | 2/2006 |

OTHER PUBLICATIONS

International Search Report and Written Opinion (Application No. PCT/EP2013/077900) dated Apr. 28, 2014.

(Continued)

Primary Examiner — Gregory Blankenship
(74) Attorney, Agent, or Firm — Burr & Brown, PLLC

(57) ABSTRACT

The motorhome chassis comprising —a supporting frame for providing the statically supporting characteristics, —a floor layer for defining the structural base for a living area above the floor layer, —a traction unit or an attachment means for a traction unit, —at least one cavity, in particular a stowage compartment in the region surrounding the supporting frame,
wherein the cavity is detachably fastenable to the supporting frame, is constructed as an exchangeable module and serves as a crumple zone in the event of vehicle collisions.

16 Claims, 9 Drawing Sheets

(56) References Cited

U.S. PATENT DOCUMENTS

| | | | | |
|---|---|---|---|---|
| 5,501,504 | A * | 3/1996 | Kunz | B62D 25/2054 280/783 |
| 5,921,615 | A * | 7/1999 | Gimenez | B60P 3/32 280/783 |
| 6,540,285 | B2 * | 4/2003 | Crean | B62D 33/046 296/164 |
| 6,807,735 | B2 * | 10/2004 | Crean | B62D 21/02 29/469 |
| 7,175,202 | B2 * | 2/2007 | Budica | B60P 3/34 280/781 |
| 7,338,109 | B1 * | 3/2008 | Crean | B60P 3/34 296/164 |
| 8,083,280 | B2 * | 12/2011 | Muglia | B60R 9/02 296/178 |
| 8,876,160 | B2 * | 11/2014 | Olson | B62D 21/02 180/312 |
| 2004/0261267 | A1 * | 12/2004 | Crean | B62D 21/02 29/897.2 |
| 2009/0218839 | A1 * | 9/2009 | Muglia | B60R 9/02 296/24.4 |
| 2009/0230729 | A1 * | 9/2009 | Lusk | B29C 70/443 296/193.07 |
| 2013/0256050 | A1 * | 10/2013 | Novotny | B60R 21/13 180/271 |
| 2014/0151141 | A1 * | 6/2014 | Ehl | B60K 5/00 180/233 |
| 2014/0181781 | A2 * | 6/2014 | Sugaya | G06F 17/5068 716/136 |
| 2016/0001692 | A1 * | 1/2016 | Ehl | B60P 3/36 296/187.11 |
| 2016/0152273 | A1 * | 6/2016 | Kuriyama | B62D 21/152 296/187.09 |

OTHER PUBLICATIONS

International Preliminary Report on Patentability (Application No. PCT/EP2013/077900) mailed Jul. 2, 2015.

* cited by examiner

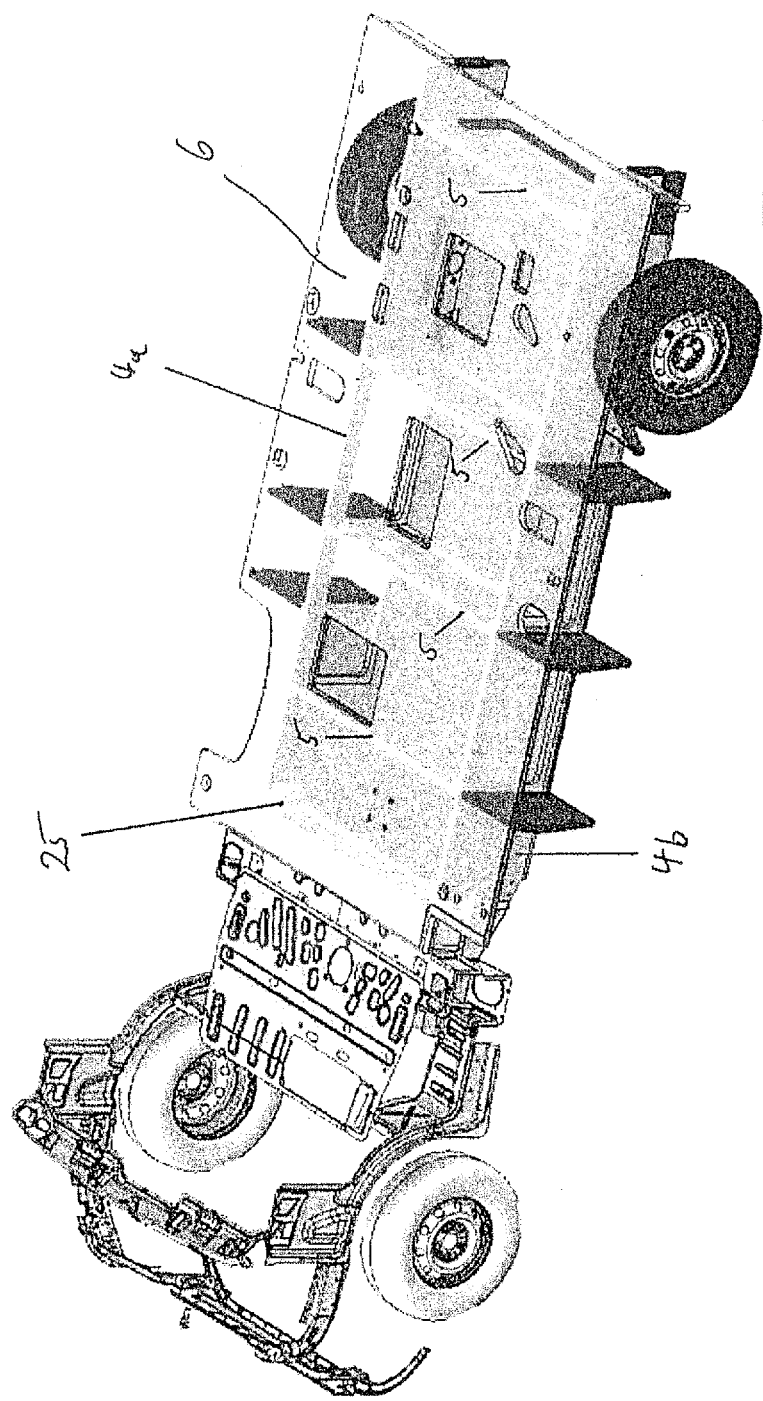

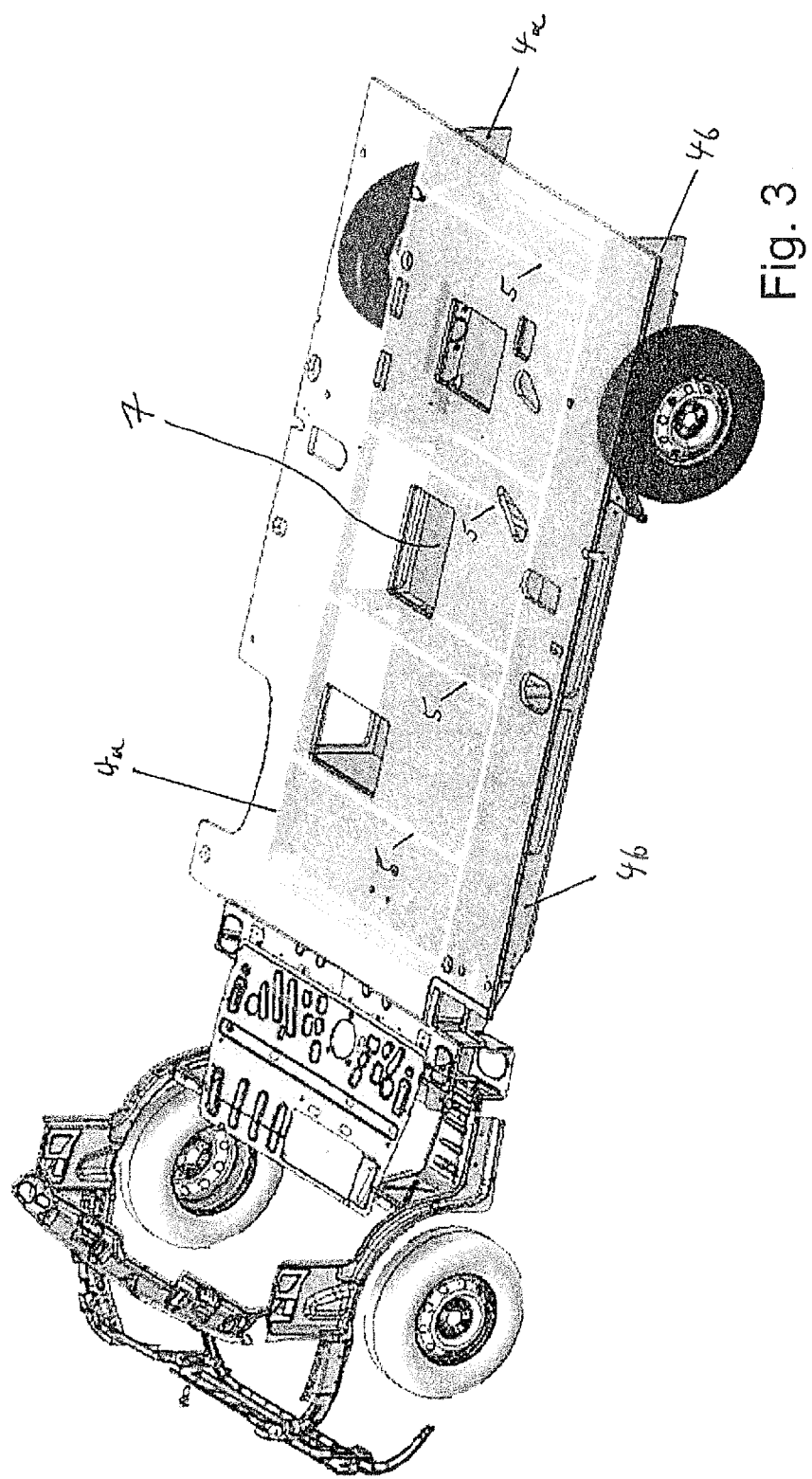

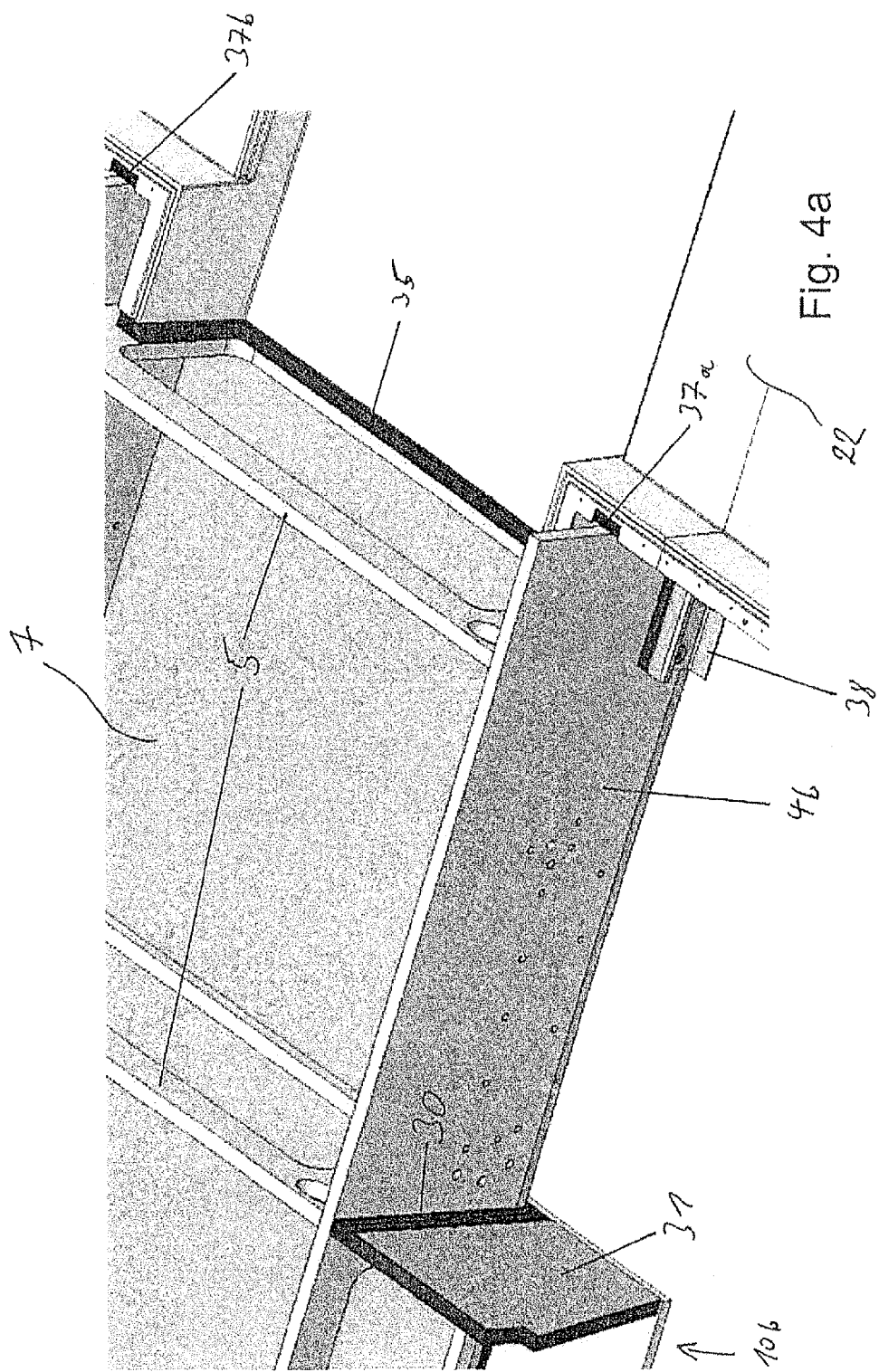

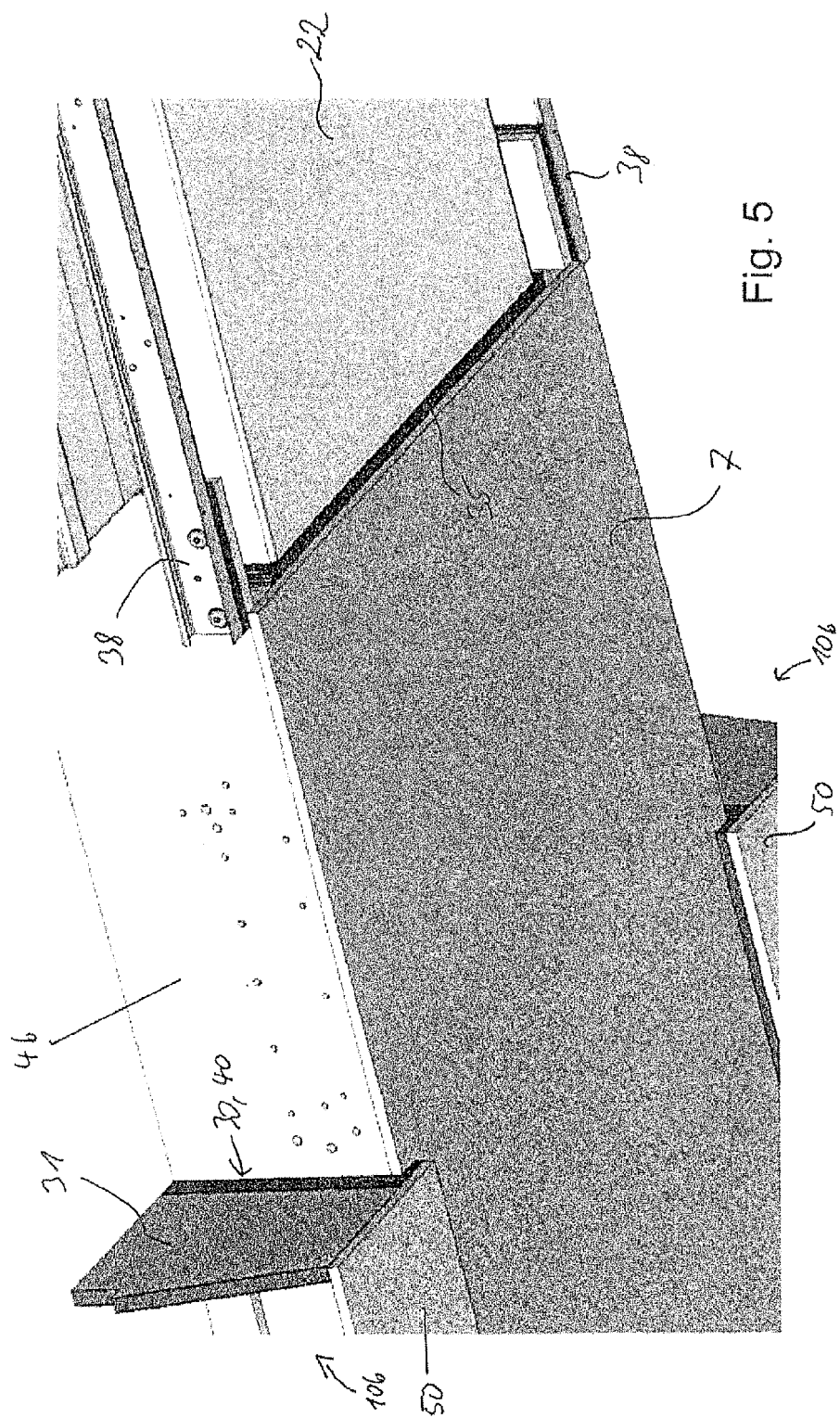

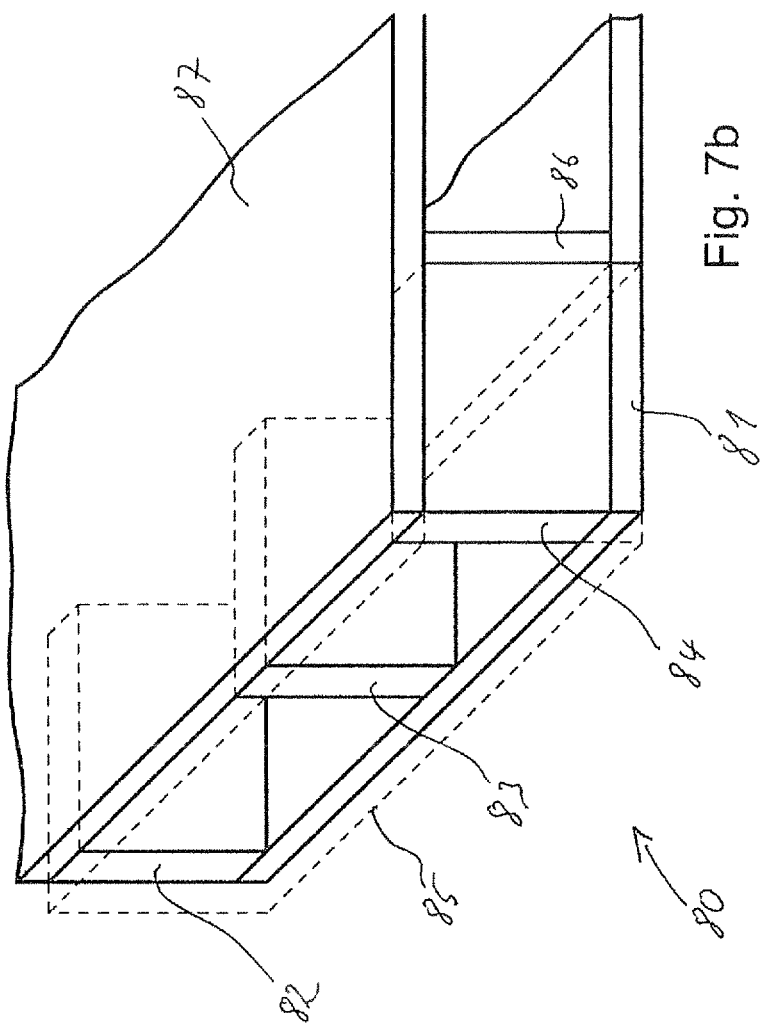

LIGHTWEIGHT CHASSIS

FIELD OF THE INVENTION

The invention relates to a motorhome chassis, and to a corresponding chassis for a caravan.

BACKGROUND OF THE INVENTION

Lightweight constructions, in particular lightweight chassis, are of greatly increasing relevance in the construction of motorhomes and caravans. This is based firstly on the demand for ever more lightweight and thus economical superstructures with regard to overall weight, but secondly, the legal situation in terms of particular restrictions on overall weight with regard to the required driver's license in the respective sales markets is also an important factor in the development of motorhomes, caravans and recreational vehicles.

A problem of lightweight chassis and superstructures is that they are generally of highly rigid form and, owing to self-stiffening structures, cannot absorb deformation energy in a controlled manner in the event of a crash. To provide defined crumple zones, it is possible for bumper strips to be fitted, similarly to those on a heavy goods vehicle. These, however, always take up important stowage space in a motorhome or caravan, which stowage space is then no longer available for luggage. Furthermore, the attachment of additional edge strips or bumpers contradicts the aesthetic overall concept, which is of primary importance in the case of a holiday vehicle.

SUMMARY OF THE INVENTION

The invention is thus based on the object of further developing a motorhome such that the stated disadvantages of the prior art are alleviated. In particular, it is sought to alleviate the disadvantages of a lightweight construction of a motorhome or caravan with regard to the total amount of damage that occurs in the event of a collision.

According to the invention, said object is achieved by means of a motorhome chassis which comprises a supporting frame for providing the statically supporting characteristics, a floor layer for defining the structural base for a living area above the lower layer, a traction unit or an attachment means for a traction unit, and at least one cavity, in particular a stowage space in the region surrounding the supporting frame. The invention is characterized in that the cavity is detachably fastenable to the supporting frame, is constructed as an exchangeable module and serves as a crumple zone in the event of vehicle collisions.

In this way, in the event of a collision, the required absorption of energy can be realized in the cavity, which is thus duly deformed and possibly also destroyed, but which, owing to its modular construction, is easily replaceable, in particular without the need for manipulation of the supporting frame or main chassis or of the floor layer.

For protection of the supporting sandwich-type chassis structure and of the occupants, decoupled stowage compartments which are mounted on the rear end, on the sides and possibly on the front of a chassis, should absorb the energy of a crash. Energy absorption elements and predetermined breaking points should be configured so as to attain optimum occupant protection while at the same time realizing the most extensive possible protection of the main chassis. In the event of minor collisions, the main chassis should be protected against damage. Thus, a sandwich-type lightweight chassis for caravans and motorhomes is realized which is constructed so as to comprise a main chassis on which "crash" and stowage compartment boxes are mounted.

In one advantageous embodiment, it is provided that the cavity comprises flange means which enable the cavity to be mounted on and removed from the supporting frame and/or the floor layer without the need for disassembly of the supporting frame and/or the floor layer.

Simple repair can be performed by exchanging the mounted parts ("crash boxes" = lateral stowage compartments, garage structure on the rear end, possibly additional components). In the event of a severe crash, the overall system should absorb a large amount of energy and protect the occupants. The function of airbags should also be taken into consideration in the design.

One advantageous embodiment presents a motorhome chassis, wherein the cavity comprises at least three wall elements, wherein at least one wall element forms a termination with respect to the exterior surroundings of the motorhome. The incorporation of the cavities as "crash" boxes can in this case be easily incorporated into the aesthetic overall concept of the vehicle. Here, it is advantageous for the "crash" and stowage compartment boxes to be attached by way of sandwich panels, onto which there is snapped a cover layer.

Moreover, provision is made for a motorhome chassis to be characterized in that decoupling means are provided between the cavity and the supporting frame and/or floor layer, wherein, by way of the decoupling means, a force acting on the cavity is not transmitted, or is transmitted in weakened form, to the supporting frame and/or to the floor layer. By way of the decoupling means, it is possible in particular in the event of relatively minor collisions for the energy for absorption to be absorbed in targeted fashion, wherein the absorption of energy is realized in a manner decoupled from the supporting frame and/or the floor layer, such that said components are not subjected to damage or excessive loading.

It is also possible for additional components to be provided which realize the decoupled attachment, the sealing and the targeted absorption of energy. It may additionally be equipped with slots and predetermined breaking points.

The floor itself may be of two-part or multi-part form in order that the forces that can act on the side walls are also decoupled from the main chassis. The "crash" and stowage compartment boxes are possibly additionally equipped, in their sandwich construction, with slots and predetermined breaking points for improved energy absorption.

It is also advantageous for the cavity to comprise one or more compartments which are in the form of stowage boxes and/or in the form of a stowage box with at least one partition. This increases the flexibility with regard to the configuration of the stowage compartments.

It is furthermore provided that the cavity is fastened to the supporting frame by way of flange means such that, in the event of a collision, the flange means at least partially slide off the supporting frame, for example, can slide off by way of an oblique plane or a parallel guide. The corresponding design of the flange means permits more extensive protection of the projecting chassis structure, such that in the event of a collision, the energy for absorption is no longer transmitted, or only a defined fraction of said energy is transmitted, to the supporting frame and/or to the floor panel. In this case, the construction is simplified considerably as only parallel connections have to be realized, for example, by way of bolts, screws, guides, plug-in connections or the like.

In one advantageous embodiment, it is provided that the cavity is composed substantially of wall elements that can be plugged one inside the other. Flexible and simple separation is possible in this way.

In a further embodiment of the chassis according to the invention, it is provided that the cavity comprises lightweight structural panels, wherein the lightweight structural panels are composed in particular of a lightweight structural core, composed preferably of a foamed material or a honeycomb panel, and of at least one top layer, composed preferably of metal, fiber composite or plastic.

With high stability and simultaneously low weight, the characteristics can thus be well-coordinated with the overall concept of the lightweight construction.

For this purpose, a main chassis is constructed on which "crash" and stowage compartment boxes are mounted. The connection should be realized for example by way of sandwich panels onto which the cover layers are snapped. The core material (for example energy-absorbing foam) serves to realize adequate connection and sealing.

In an advantageous embodiment of a motorhome chassis, it is provided that the supporting frame comprises metallic longitudinal members. If the longitudinal members are formed in particular as steel members, the additional structure composed of lightweight materials can be attached in an effective manner without the need to install a considerable number of structural stiffening materials. In particular, it is advantageous for the supporting frame to be in the form of a ladder frame. In this case, the transverse elements are also constructed as either metallic or sandwich-type lightweight structural panels.

If it is moreover provided that the supporting frame comprises an upper chord and/or a lower chord, wherein the upper chord and/or the lower chord are/is preferably composed of lightweight structural materials, the overall weight of the chassis can be considerably reduced, wherein the structural base offers flexible structural possibilities. An upper chord within the meaning of the invention is a cover layer arranged above the supporting frame, which cover layer possibly forms the floor level or the floor layer and constitutes a top-side stiffener. Correspondingly, the lower chord acts as a stiffener on the underside. The upper chord and lower chord are advantageously in the form of sandwich-type lightweight structural panels.

It is also an intention for the principle of the "crash boxes" to be used in the case of a sandwich-type complete chassis. Here, the usage is all the more important as, in the event of a front-on collision, in the event of a very stiff chassis, it can be assumed that the occupants will be subjected to extreme loads. A special feature in relation to commercially available motorhomes arises through the use of the overall system for stability, crash safety/occupant protection, stowage compartments and weight optimization. A planar, continuous floor from the driver's cab into the living area is provided. The stowage compartments should be designed as "crash boxes" (see description above).

A main chassis manufactured from sandwich panels accommodates the front and rear axles, engine and drivetrain, steering arrangement, dashboard, seat and seatbelt fastenings and the furniture and stowage compartments that are typical of a motorhome.

A further advantage is the possibility of reducing the floor and entry height and also positively influencing the driving characteristics by way of a low center of gravity.

The above-described principle is also transferable to a caravan chassis. In this case, the attachment of a traction unit is omitted. Corresponding superstructures are likewise included in the core concept according to the invention.

It is also conceivable for a complete sandwich-type lightweight chassis to be constructed, wherein the furniture and stowage compartments that are typical of a motorhome can be fastened to and/or are mounted on the complete chassis.

Sandwich-type lightweight structural materials are to be understood to mean a construction in which a core layer, composed for example of a foamed material or a honeycomb panel or the like, is enclosed by at least one cover layer, preferably an upper and a lower cover layer. In this case, transverse forces and bending moments are absorbed by the cover layers which are spaced apart by means of the core layer, and stiffening is realized by way of the resulting different tensile elongation moments and/or shear forces.

BRIEF DESCRIPTION OF THE DRAWINGS

Below, the invention will be briefly discussed in more detail on the basis of the exemplary embodiment shown in the figures. The invention is, however, not restricted to the illustrated embodiment. The invention rather encompasses those embodiments which make use of the technical teaching of the subjects specified in the patent claims.

In the figures:

FIG. 2 is an illustration as per FIG. 1, with only stowage compartment walls;

FIG. 3 is an illustration as per FIG. 1, without stowage compartments;

FIG. 4a shows a detail from FIG. 1 for illustrating the flange means;

FIG. 5 is a schematic illustration of the flange means for the parallel sliding-off action;

FIGS. 7a and 7b illustrate the modular construction.

Where expedient, identical or corresponding articles are denoted by the same reference signs.

DETAILED DESCRIPTION OF THE INVENTION

Figure 1:
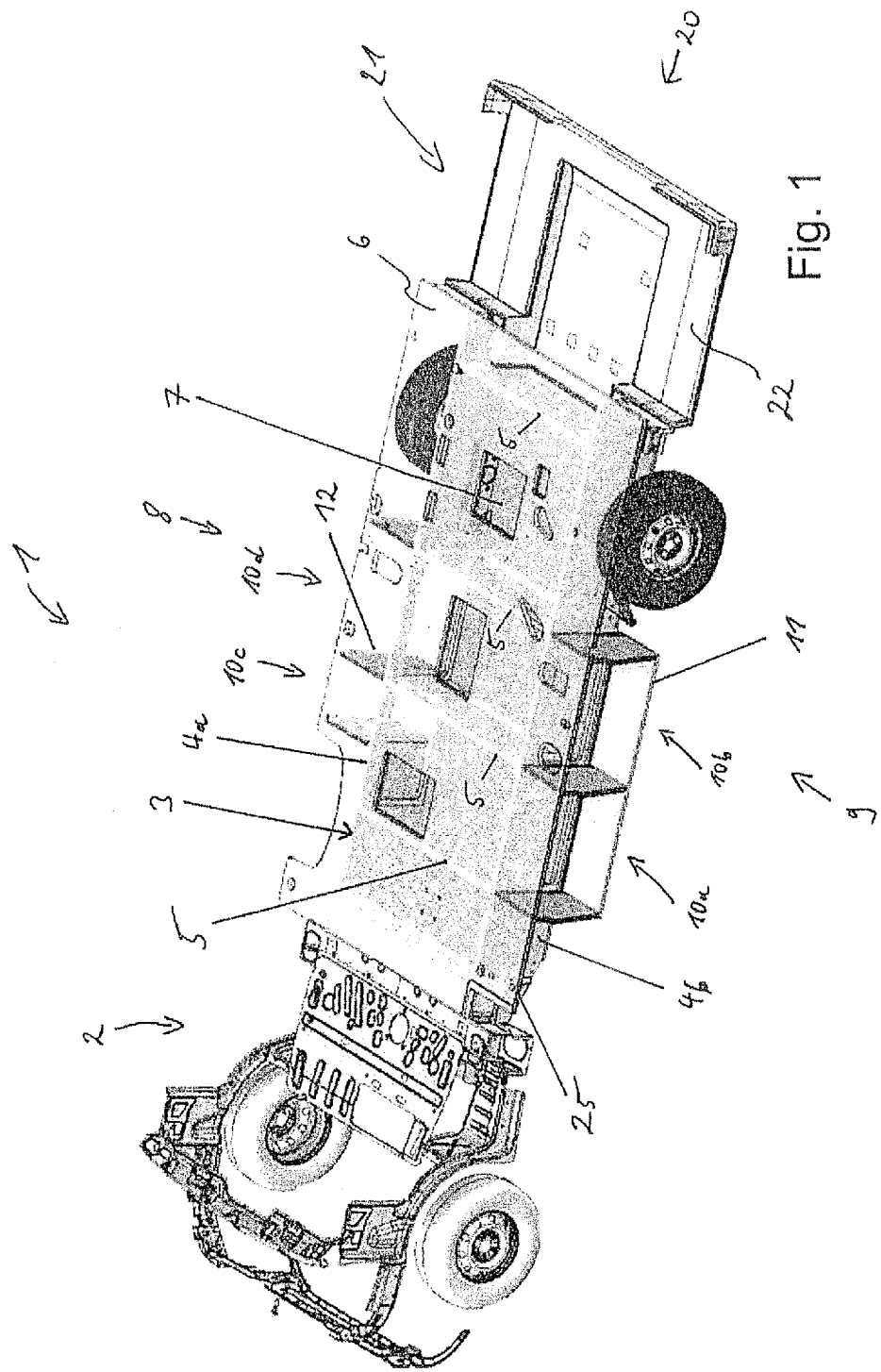
FIG. 1 is an illustration of a lightweight chassis with a ladder frame and mounted stowage boxes and a mounted rear garage.

In detail, FIG. 1 shows a motorhome chassis 1 with a traction unit 2 and with a supporting frame 3. The supporting frame 3 is constructed as a frame with longitudinal members 4a, 4b and transverse struts 5. On its top side, the supporting frame is covered by a floor layer 6. On its bottom side, the frame is closed off by way of a lower chord 7.

At the right-hand side region 8 and at the left-hand side region 9, there are arranged cavities 10a-d which are formed by mounted cavity modules 11, 12. The cavity modules 11, 12 in this case comprise in each case two cavities 10a-d, wherein the longitudinal members 4a, 4b have apertures in order that articles can be loaded into the region between the floor layer 6 and the lower chord 7, or an assembly base can be formed there.

At the rear region 20, there is provided a cavity 21 in the form of a rear garage. In the present case, only the floor layer 22 of the rear garage is illustrated, on which floor layer the rear garage is then constructed. The traction unit 2 is connected to the supporting frame 3 by way of attachment means 25 and thus realizes a unit as a motorhome chassis.

The illustrations in FIGS. 2 and 3 serve for explanation, and are designated correspondingly. In FIG. 2, it is envisaged for the cavities to possibly be divided up by way of separate partition elements in order to realize a simplified connection of the cavity modules (see FIGS. 7a, 7b).

Figure 4B:
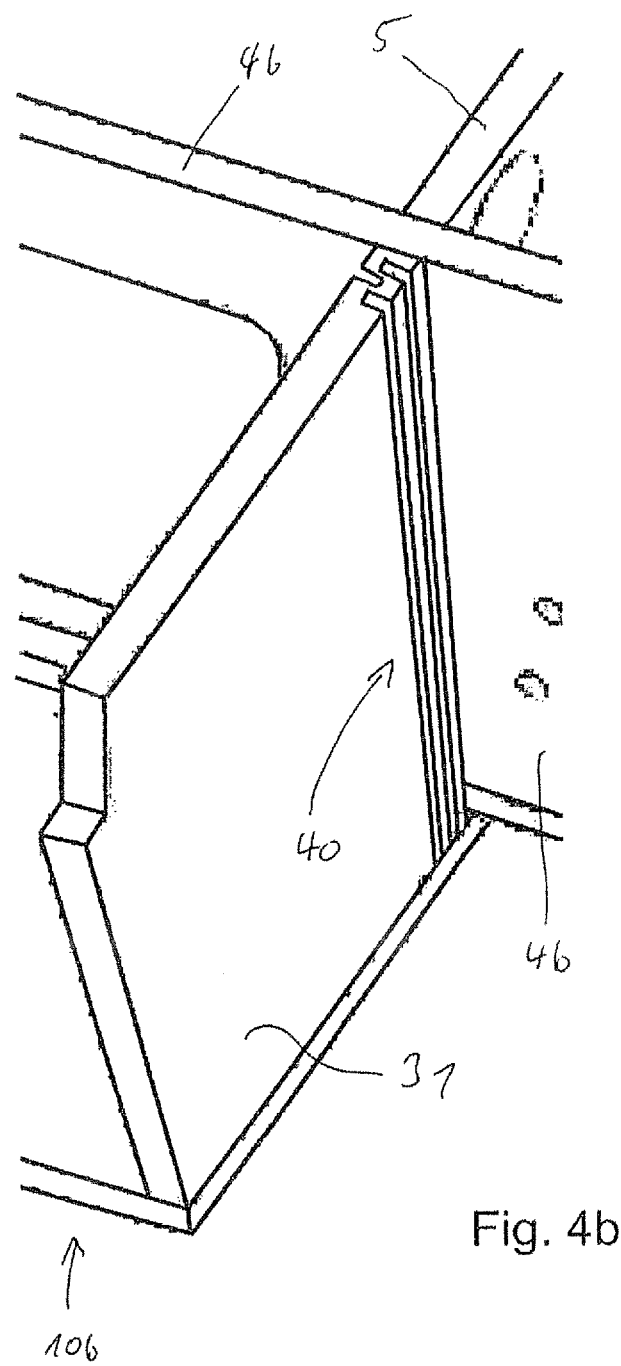
FIG. 4b is a schematic illustration of the decoupling means.

In FIG. 4a, the flange means 30 between a wall element 31 of a cavity 10b and the longitudinal member 4b are illustrated. The flange means may take the form of a plug-in connection, adhesive connection, screw connection or bolt connection or the like, depending on the condition of the material selected for the wall element 31. A flange means 35 is also provided between the floor layer of the rear garage 22 and the rear transverse strut 5. Between the walls 36 of the rear garage and the longitudinal members 4a, 4b, there are provided decoupling means 37a,b which serve as energy absorption means in the event of a minor collision. The flange means 35 may also have corresponding decoupling characteristics.

Moreover, the floor layer of the rear garage 22 is screwed to the longitudinal member by way of members 38. In the event of a collision, said members can slide off in parallel with respect to the longitudinal members and thus likewise serve as decoupling means or constitute a predetermined breaking point. In the event of a fracture, the corresponding bolt or the screw is sheared, and the members can perform a parallel offset movement with respect to one another.

FIG. 4b illustrates once again a decoupling means 40 in the form of a meandering structure, in the case of which minor deformation can be absorbed and isolated from the supporting frame.

FIG. 5 shows, for illustration, the underside of the embodiment illustrated in FIG. 4a. The floor layers 50 of the cavities 10b and 10d can likewise slide off in parallel under the lower chord 7, such that corresponding decoupling is realized here too.

Figure 6A:
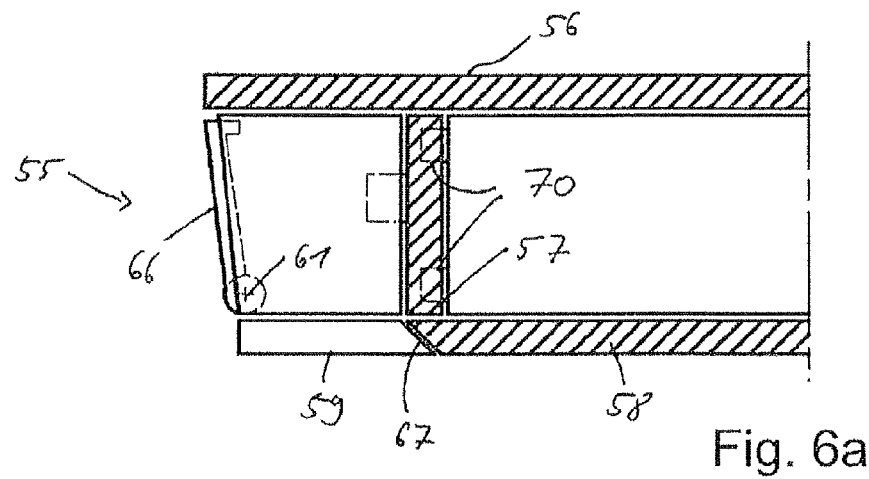
FIGS. 6a-6c illustrate the process of a deformation of the cavity in the event of a collision.
Figure 6B:
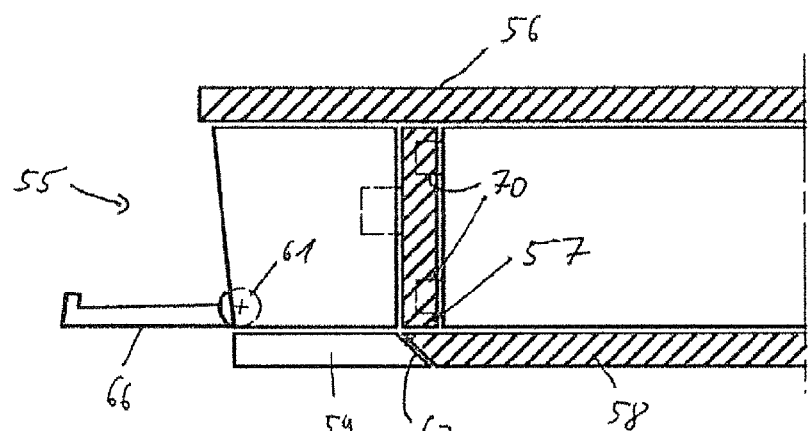
Figure 6C:
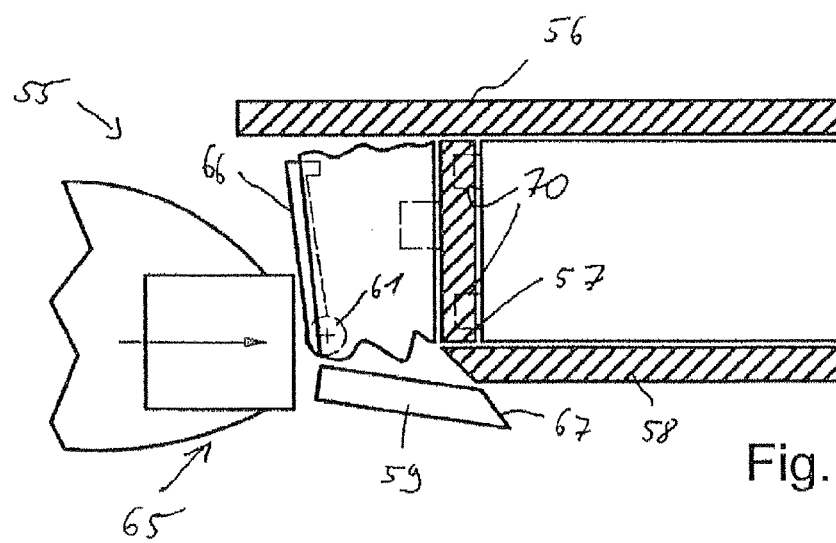

FIGS. 6a-c show the process of a deformation of a cavity 55. The cavity is delimited below the floor layer 56 and on one side by the longitudinal member 57, and, by way of its floor 59, adjoins the lower chord 58. The outer wall part is closed off by way of a front flap 60 which can be opened by means of a joint 61, in order that the cavity can be loaded (FIG. 6b).

In the event of a collision with a vehicle 65 or the like, the cavity 55 (schematically illustrated) and the floor 59 can slide off owing to the formation of an oblique plane 67. This is envisaged as an alternative embodiment to the parallel offset described above.

The cavity itself is connected at its rear wall to the longitudinal member 57 by way of flange means 70.

Figure 7A:
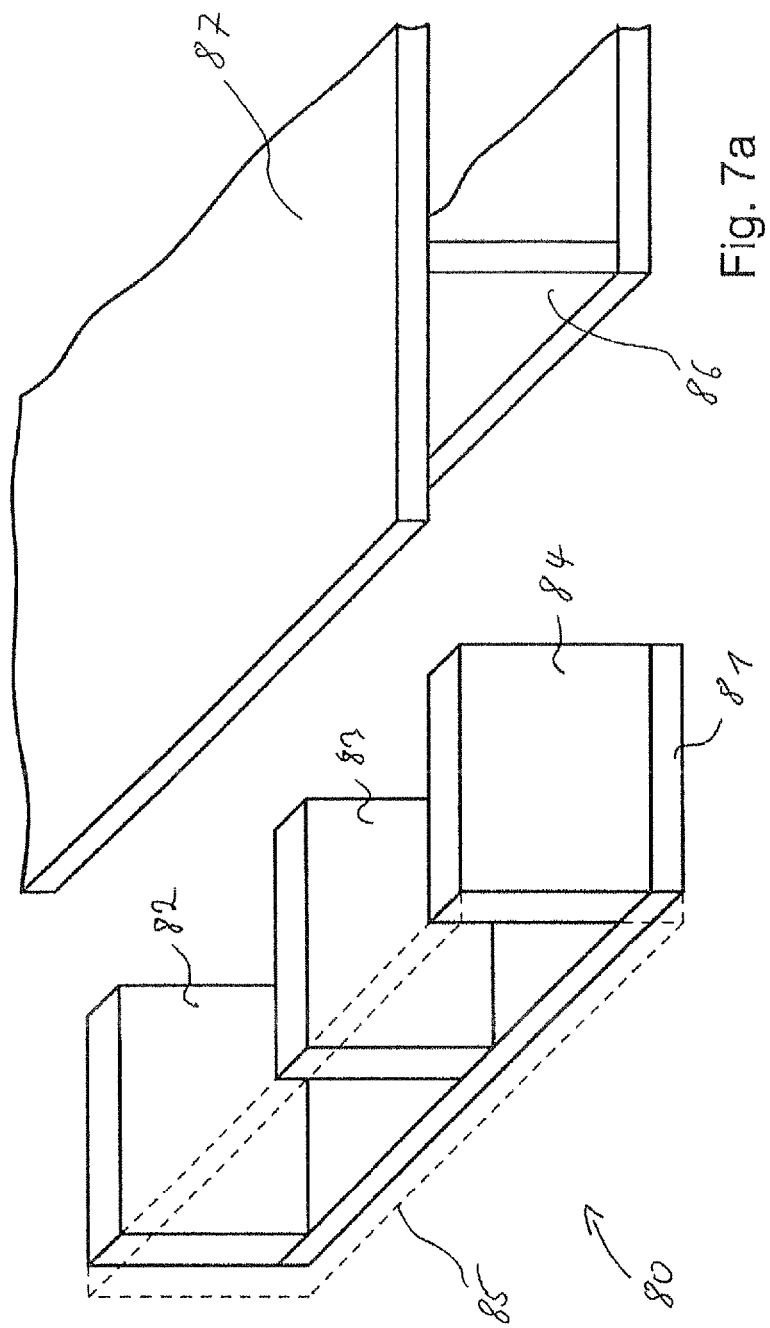

FIGS. 7a and 7b are schematic illustrations of an exchangeable cavity module 80 which comprises a floor element 81, three wall elements 82, 83, 84 and a front element 85 (illustrated by dashed lines). The front element is intended to be designed entirely or partially as an opening flap, depending on the structural requirements placed on the stowage compartment. The cavity module 80 is arranged below the floor layer 87 on the supporting frame 86, and forms the "crash" boxes according to the invention in the form of stowage compartments. FIG. 7b shows the assembled state.

LIST OF REFERENCE NUMERALS

1 Motorhome chassis
2 Traction unit
3 Supporting frame
4a Longitudinal member
4b Longitudinal member
5 Transverse struts
6 Floor layer
7 Lower chord
8 Right-hand side region
9 Left-hand side region
10a-d Cavities
11 Cavity module
12 Cavity module
20 Rear-end region
21 Cavity
22 Floor layer of the rear garage
25 Attachment means
30 Flange means
31 Wall element
35 Flange means
36 Wall of the rear garage
37a,b Decoupling means
40 Decoupling means (meander)
50 Floor layer
55 Cavity
56 Floor layer
57 Longitudinal member
58 Lower chord
59 Floor
60 Front flap
61 Joint
65 Vehicle
67 Oblique plane
70 Flange means
80 Cavity module
81 Floor element
82 Wall element
83 Wall element
84 Wall element
85 Front element
86 Supporting frame
87 Floor layer

The invention claimed is:

1. A motorhome chassis comprising:
    a supporting frame for providing the statically supporting characteristics,
    a floor layer for defining the structural base for a living area above the floor layer,
    a traction unit or an attachment mechanism for a traction unit,
    at least one cavity in the region surrounding the supporting frame, wherein the cavity is detachably fastenable to the supporting frame, is constructed as an exchangeable module and serves as a crumple zone in the event of vehicle collisions, and
    decoupling means between the cavity and the supporting frame and/or the floor layer, wherein, by way of the decoupling means, a force acting on the cavity is not transmitted, or is transmitted in weakened form, to the supporting frame and/or the floor layer.

2. The motorhome chassis according to claim 1, wherein the cavity is arranged adjacent to the floor layer.

3. The motorhome chassis according to claim 1, wherein the cavity is arranged in the rear end of the motorhome chassis to form a rear garage.

4. The motorhome chassis according to claim 1, wherein the cavity comprises flange means which enable the cavity to be mounted on and removed from the supporting frame and/or the floor layer without the need for disassembly of the supporting frame and/or floor layer.

5. The motorhome chassis according to claim 1, wherein the cavity comprises at least three wall elements, wherein at least one wall element forms a termination with respect to the exterior surroundings of the motorhome.

6. The motorhome chassis according to claim 1, wherein the cavity comprises one or more compartments which are in the form of multiple stowage boxes and/or in the form of a stowage box with at least one partition.

7. The motorhome chassis according to claim 1, wherein the cavity is fastened to the supporting frame by way of flange means such that, in the event of a collision, the flange means at least partially slide off the supporting frame.

8. The motorhome chassis according to claim 1, wherein the cavity is composed substantially of wall elements that can be plugged one inside the other.

9. The motorhome chassis according to claim 1, wherein the cavity comprises lightweight structural panels, wherein the lightweight structural panels are composed of a lightweight structural core, composed of a foamed material or a honeycomb panel, and of at least one top layer, composed of metal, fiber composite or plastic.

10. The motorhome chassis according to claim 1, wherein the supporting frame comprises metallic longitudinal members.

11. The motorhome chassis according to claim 1, wherein the supporting frame is in the form of a ladder frame.

12. The motorhome chassis according to claim 1, wherein the supporting frame comprises an upper chord and/or a lower chord, wherein the upper chord and/or the lower chord are/is composed of lightweight structural materials.

13. The motorhome chassis according to claim 1, wherein the at least one cavity is a stowage compartment.

14. The motorhome chassis according to claim 1, wherein the cavity is arranged below the floor layer in the side region.

15. The motorhome chassis according to claim 7, wherein the flange means can slide off by way of an oblique plane or a parallel guide.

16. A caravan chassis comprising:
a supporting frame for providing the statically supporting characteristics,
a floor layer for defining the structural base for a living area above the floor layer,
at least one cavity in the region surrounding the supporting frame, wherein the cavity is detachably fastenable to the supporting frame, is constructed as an exchangeable module and serves as a crumple zone in the event of vehicle collisions, and
decoupling means between the cavity and the supporting frame and/or the floor layer, wherein, by way of the decoupling means, a force acting on the cavity is not transmitted, or is transmitted in weakened form, to the supporting frame and/or the floor layer.

* * * * *